No. 867,454. PATENTED OCT. 1, 1907.
S. C. WAGNER.
VEHICLE AXLE.
APPLICATION FILED MAR. 8, 1907.
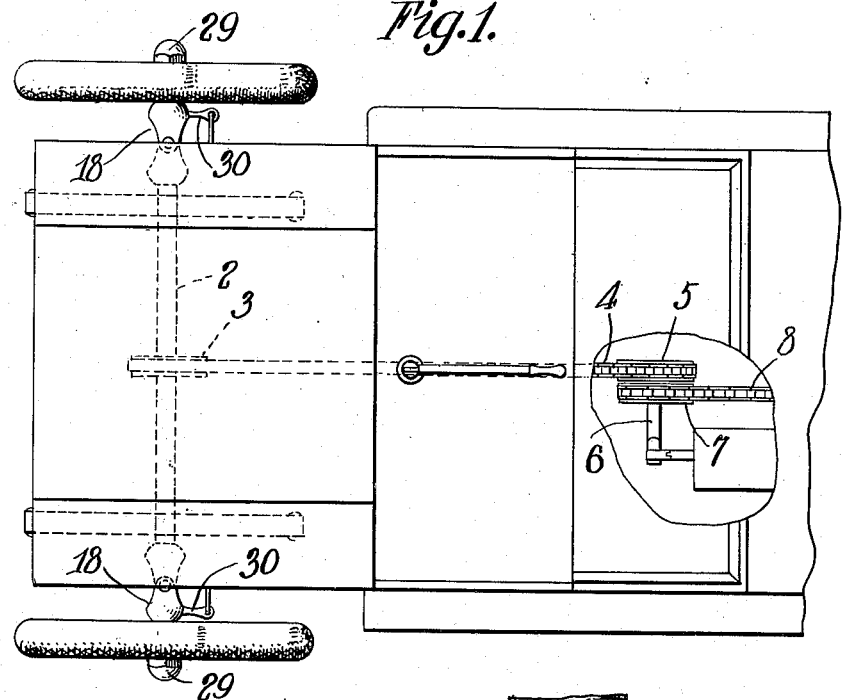
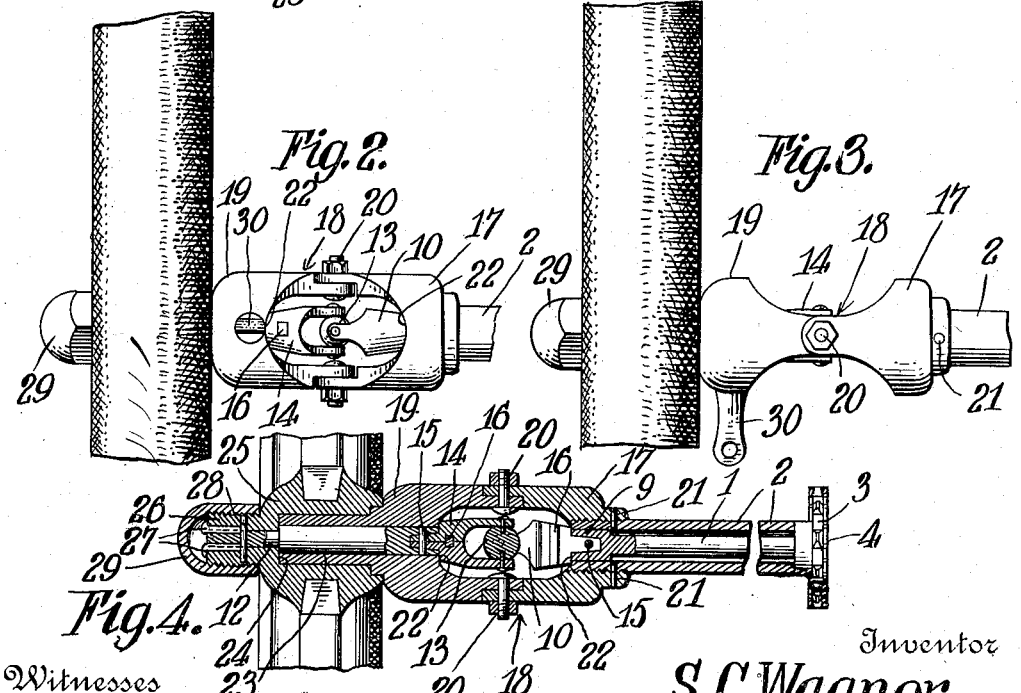
Witnesses
C. E. Smith.
C. H. Griesbauer.
Inventor
S. C. Wagner.
by H. B. Willson & Co.
Attorneys

UNITED STATES PATENT OFFICE.

SAMUEL C. WAGNER, OF ABILENE, TEXAS.

VEHICLE-AXLE.

No. 867,454.  Specification of Letters Patent.  Patented Oct. 1, 1907.

Application filed March 8, 1907. Serial No. 361,285.

*To all whom it may concern:*

Be it known that I, SAMUEL C. WAGNER, a citizen of the United States, residing at Abilene, in the county of Taylor and State of Texas, have invented certain new and useful Improvements in Vehicle-Axles; and I do declare the following to be a full, clear, and exact description of the invention, such as will enable others skilled in the art to which it appertains to make and use the same.

This invention relates to improvements in vehicle axles.

The object of the invention is to provide a front steering axle for motor vehicles so constructed as to permit the front wheel to be positively driven irrespective of the angle to which the same may be turned.

A further object is to provide a flexible axle of this kind which will be simple, strong and durable in construction, efficient and reliable in operation, and well adapted to the purpose for which it is designed.

With these objects in view, the invention consists of certain novel features of construction, combination and arrangement of parts, as will be more fully described and particularly pointed out in the appended claims.

In the accompanying drawings, Figure 1 is a plan view of a portion of a motor vehicle showing the arrangement of the front axle; Fig. 2 is a side elevation of one end of the axle and the wheel thereon; Fig. 3 is a plan view of the same; and Fig. 4 is a vertical longitudinal sectional view of the parts shown in Figs. 2 and 3.

Referring more particularly to the drawings, 1 denotes the main portion of the axle which is mounted in bearing sleeves, 2, secured to the underside of the vehicle body in any suitable manner.

On the axle, 1, midway between its ends, is mounted a sprocket gear, 3, which is adapted to be connected by a sprocket chain, 4, to a driving gear, 5, on the motor shaft, 6, of the vehicle. Said motor shaft being also provided with a sprocket wheel, 7, which is connected by a sprocket chain, 8, to a sprocket gear on the rear axle (not shown), thus providing for the positive driving of both the front and rear axles.

On the outer ends of the axle 1 are formed enlarged heads, 9, which bear in the outer end of each sleeve, 2, as shown.

To the outer end of each head 9 of the axle is connected the inner member, 10, of a universal joint connection between the axle, 1, and the wheel spindle, 12. The outer end of the member 10 is bifurcated and pivotally connected to the opposite sides of the central or ball member 13, of the universal joint. Pivotally connected to the ball, 13, diametrically opposite to the pivotal connection of the member 12 is the outer member, 14, of the universal joint, said member being connected at its outer end to the spindle, 12, of the axle. The members 10 and 14 of the universal joint connection are each preferably formed in two separable sections or halves, which are secured together by pins, 15, which are passed through said sections and through the inner ends of the axle and the spindle, said pins thereby also securing said members of the joint into engagement with the axle and spindle. The outer ends of the members, 10 and 14, are preferably reduced and tapered to fit within tapered apertures or recesses formed in the ends of the axle and the spindle, as shown. The parts of the members 10 and 14 are further secured against movement by means of rectangular keys, 16, which are inserted in alined grooves or recesses formed in the meeting sides of the parts.

The outer ends of the sleeves, 2, are threaded and on said threaded ends is adapted to be screwed the inner section 17 of a two-part casing, 18, the outer section 19 of which is hingedly connected to the said inner section to permit the former to turn to various angles in a horizontal plane. The sections 17 and 19 of the casing 18 are cut away or recessed on opposite sides of their inner ends as shown. The engaging edges of the section are notched or recessed and said notched portions are overlapped and provided with alined bolt holes in which are adapted to be inserted pivot bolts, 20, whereby said sections are hingedly connected together to permit the outer section to swing on the inner section as hereinbefore described.

In the threaded end of the inner section 17 of the casing and the outer end of the sleeve is formed alined passages in which are adapted to be inserted locking pins, 21, whereby said inner section is prevented from becoming unscrewed from the outer end of the sleeve, 2.

The members 10 and 14 of the universal joint are provided with squared shoulders, 22, formed by the reduced outer ends thereof, and said shouldered portions of the member 10 are adapted to bear against the inner ends of the axle, 1, and sleeve, 2, while the shouldered portion of the member 14 is adapted to bear against the inner end of the spindle, 12, and the adjacent inner slot of the outer section, 19, of the casing.

The outer section 19 of the casing is provided with a reduced cylindrical tubular extension, 23, which forms a boxing for the axle spindle and a bearing upon which the hub of the wheel is adapted to turn. At the inner end of the extension, 23, are formed shoulders, 24, against which is adapted to fit the annular recessed inner end of the wheel hub, 25, which is revolubly mounted on said extension, 23.

The outer end of the hub, 25, is provided with a reduced extension 26 in which is formed a centrally disposed reduced passage to receive the reduced outer end of the spindle, 12, as shown. In said reduced outer end of the spindle, 12, and the adjacent wall of the extension 26 are formed alined grooves or channels in which are adapted to be inserted keys, 27, whereby the hub is locked into engagement with the axle spindle to cause the wheel to be turned by the latter. The hub, 25, is further secured against rotation and held in place on the spindle, 12, by means of a locking pin, 28, which is passed through alined apertures in the extension, 26, of the hub, and the reduced extension of the spindle, as shown.

The extension 26 of the hub is provided with a series of exterior screw threads and upon said threaded extension is adapted to be screwed a cap, 29, said cap serving to hold the keys, 27, and the pin 28 in place, and also to prevent the entrance of dust or foreign matter to the bearing portion of the spindle.

By providing an axle having spindles connected thereto by a universal joint and inclosed in a sleeve and casing constructed as herein shown and described, the axle and the wheels fixedly mounted thereon may be positively driven irrespective of the angle to which said spindles and wheels are turned, thereby materially aiding in the propulsion of the vehicle over rough and heavy roads.

The outer section 19 of the casing is provided on its inner side with a rearwardly projecting lug, 30, to which is adapted to be connected the usual or any suitable form of steering rods, by means of which said outer end of the casing, the spindle and the parts carried thereby, may be swung or turned to any angle to permit the vehicle to make the desired turns.

From the foregoing description, taken in connection with the accompanying drawings, the construction and operation of the invention may be readily understood without requiring a more extended explanation.

Various changes in the form and proportion, and the minor details of construction may be resorted to without departing from the principle or sacrificing any of the advantages of this invention as defined in the appended claims.

Having fully described my invention, what I claim as new, and desire to secure by Letters-Patent, is:

1. An axle of the character described, means whereby said axle is driven, a bearing sleeve on said axle, a spindle, a universal joint connection between said spindle and axle, said connection comprising a central ball member and inner and outer members pivotally connected at diametrically opposite points to said central ball member, said inner and outer sections being formed in separable parts, means to secure said parts of the members together and into engagement with the inner end of the axle and the spindle, a two-part casing arranged around said joint, pivot bolts to pivotally connect said parts of the casing together, means to secure the inner section of said casing to the outer end of said bearing sleeve, a tubular cylindrical extension formed on the outer end of the outer section of said casing to receive said axle spindle, a hub revolubly mounted on said bearing extension and keyed to the outer end of said spindle, a locking pin arranged through the outer end of the spindle, and a cap adapted to be screwed on the outer end of the hub, substantially as described.

2. An axle of the character described, means whereby said axle is driven, a bearing sleeve on said axle, a spindle, a universal joint connection between said spindle and axle, said connection comprising a central ball member, and inner and outer members pivotally connected at diametrically opposite points to said central ball member, said inner and outer sections being formed in separable parts, means to secure said parts of the members together and into engagement with the inner end of the axle and the spindle, a two-part casing arranged around said joint, pivot bolts to pivotally connect said parts of the casing together, means to secure the inner section of said casing to the outer end of said bearing sleeve, a tubular cylindrical extension formed on the outer end of the outer section of said casing to receive said axle spindle, a hub revolubly mounted on said bearing extension, said hub having oppositely disposed grooves adapted to be brought into alinement with similar grooves in the end of the spindle, keys adapted to be inserted into said alined grooves, a locking pin adapted to be inserted through alined holes in the extension of said hub and in said spindle, and an internally threaded cap adapted to be secured on the threaded outer end of the extension on said hub, substantially as described.

In testimony whereof I have hereunto set my hand in presence of two subscribing witnesses.

SAMUEL C. WAGNER.

Witnesses:
J. L. McDAVID.
E. P. WILLIAMSON.